(12) United States Patent
Honda et al.

(10) Patent No.: US 9,443,641 B2
(45) Date of Patent: Sep. 13, 2016

(54) ELECTRICALLY INSULATED WIRE

(71) Applicant: Hitachi Metals, Ltd., Tokyo (JP)

(72) Inventors: Yuki Honda, Hitachi (JP); Yasuhiro Funayama, Naka-gun (JP); Hideyuki Kikuchi, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 94 days.

(21) Appl. No.: 14/295,428

(22) Filed: Jun. 4, 2014

(65) Prior Publication Data

US 2014/0360756 A1 Dec. 11, 2014

(30) Foreign Application Priority Data

Jun. 6, 2013 (JP) ................................. 2013-119728

(51) Int. Cl.
| | |
|---|---|
| *H01B 3/30* | (2006.01) |
| *H01B 7/00* | (2006.01) |
| *H01B 13/06* | (2006.01) |
| *H02K 3/32* | (2006.01) |

(52) U.S. Cl.
CPC .............. *H01B 3/308* (2013.01); *H01B 3/306* (2013.01); *H01B 13/065* (2013.01); *H02K 3/32* (2013.01); *H02K 2213/03* (2013.01)

(58) Field of Classification Search
CPC ............................ H01B 3/308; H01B 7/0009
USPC .......................................... 174/119 R, 119 C
See application file for complete search history.

(56) References Cited

U.S. PATENT DOCUMENTS

| | | | |
|---|---|---|---|
| 8,008,830 B2 | 8/2011 | Kouda et al. | |
| 8,253,296 B2 | 8/2012 | Kouda et al. | |
| 8,586,869 B2* | 11/2013 | Aoi .................. | C08L 81/02 |
| | | | 174/110 R |
| 8,677,926 B2 | 3/2014 | Goto | |

(Continued)

FOREIGN PATENT DOCUMENTS

| | | | |
|---|---|---|---|
| CN | 201985652 | * | 9/2011 |
| JP | 11-016428 | | 1/1999 |
| JP | 2008123759 A | | 5/2008 |
| JP | 2011210645 A | | 10/2011 |

(Continued)

OTHER PUBLICATIONS

Japanese Office Action for corresponding Japanese Patent Application No. 2013-119728 dated May 31, 2016 and English translation thereof.

*Primary Examiner* — Timothy Thompson
*Assistant Examiner* — Charles Pizzuto
(74) *Attorney, Agent, or Firm* — Roberts Mlotkowski Safran Cole & Calderon, PC

(57) ABSTRACT

An electrically insulated wire includes a rectangular conductor having a substantially rectangular cross section with corners shaped in a circular arc, and an electrical insulating coating formed by heating an electrical insulating varnish applied to coat an outer periphery of the rectangular conductor. The electrical insulating coating includes a thickest portion and a thinnest portion in a peripheral direction thereof. The rectangular conductor has a curvature radius of the corners of 0.6 mm or less and a ratio $L_2/L_1$ of 2.0 or less where $L_1$ is a length of a short side in a width direction and $L_2$ is a length of a long side in a longitudinal direction. The electrical insulating coating has a ratio $d_1/d_2$ of 1.3 or less where $d_1$ is a coating thickness of the thickest portion and $d_2$ is a coating thickness of the thinnest portion in the peripheral direction of the electrical insulating coating.

3 Claims, 1 Drawing Sheet

(56) References Cited

U.S. PATENT DOCUMENTS

| | | |
|---|---|---|
| 2010/0141078 A1 | 6/2010 | Kouda et al. |
| 2011/0171368 A1 | 7/2011 | Goto |
| 2011/0240331 A1 | 10/2011 | Kikuchi et al. |
| 2012/0007462 A1 | 1/2012 | Kouda et al. |
| 2013/0300022 A1* | 11/2013 | Goto .................... H01B 13/065 264/171.13 |
| 2014/0054062 A1* | 2/2014 | Yoshida ............... C09D 179/08 174/110 SR |

FOREIGN PATENT DOCUMENTS

| | | |
|---|---|---|
| JP | 2012048919 A | 3/2012 |
| JP | 2012204257 A | 10/2012 |
| JP | 2012-228093 | 11/2012 |

* cited by examiner

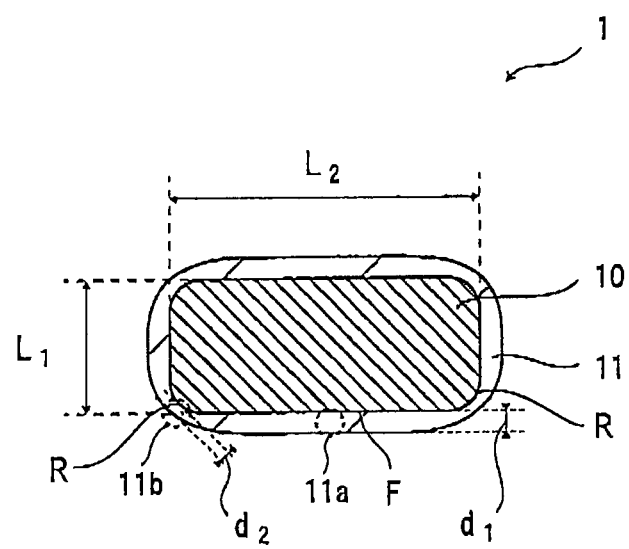

ELECTRICALLY INSULATED WIRE

The present application is based on Japanese patent application No. 2013-119728 filed on Jun. 6, 2013, the entire contents of which are incorporated herein by reference.

BACKGROUND OF THE INVENTION

1. Field of the Invention

This invention relates to an electrically insulated wire and particularly relates to an electrically insulated wire suitable for a coil of electric devices such as a motor, a transformer, etc.

2. Description of the Related Art

Electric devices such as motors, transformers, etc. are provided with a coil. The coil is formed by winding an enameled wire (electrically insulated wire) around a core. The electrically insulated wire constituting the coil includes an electrical insulating coating around an outer periphery of a conductor and the electrical insulating coating is formed by, for example, applying and baking around the conductor an electrical insulating varnish produced by dissolving a resin in an organic solvent.

In recent years, in the field of automobile electric equipment, there is a demand for reduction in size of a motor, etc. and the coil in the motor tends to be reduced in size. The wound electrically insulated wire is therefore designed to enhance its coil space factor.

To enhance the coil space factor of the electrically insulated wire, the electrically insulated wire is designed to use a rectangular electrically insulated wire using a rectangular conductor having a substantially rectangular cross section, rather than a round electrically insulated wire using a round conductor having a round cross section. This is because the rectangular electrically insulated wire has a large proportion of its conductor area in its cross section in comparison with the round electrically insulated wire, and is able to have its more enhanced space factor.

As a production method for the rectangular electrically insulated wire, the following production method is known, for example. First, a round conductor is rolled and drawn with a rectangular wire drawing die to form a rectangular conductor. Subsequently the rectangular conductor is introduced into an annealing furnace, and annealed therein. After the annealing, the rectangular conductor is introduced into a varnish feeder and coated with an electrical insulating varnish around an outer periphery of the rectangular conductor. After the coating, the coating thickness of the electrical insulating varnish is adjusted with a rectangular coating die so that the electrical insulating varnish has a predetermined coating thickness. Then the electrical insulating varnish is baked in a baking furnace to thereby form an electrical insulating coating having a predetermined coating thickness. Then these steps (the electrical insulating varnish coating, baking, etc.) are repeated to thereby form an electrical insulating coating having a predetermined coating thickness. This results in the rectangular electrically insulated wire.

Also, as another production method, the following production method is known, for example. First, an electrical insulating varnish is applied around an outer periphery of a round conductor and baked to produce a round electrically insulated wire with an electrical insulating coating having a uniform coating thickness. Then, the round electrically insulated wire is rolled so that its cross section is rectangular, and is further coated and finished with an electrical insulating varnish and baked to produce a rectangular electrically insulated wire. Refer to e.g., JP-A-11-16428 and JP-A-2011-142030.

Now, there is a demand for further reduction in motor size. When a motor coil is formed using the rectangular electrically insulated wire, the coil is molded so that an end thereof is small. The coil end here refers to a projecting portion from a stator core when the rectangular electrically insulated wire is wound around the stator core. If the coil end is large, i.e. if the projecting rectangular electrically insulated wire is large in length, the coil and the motor will be prevented from reduction in size. To reduce the size of this coil end, a method has been suggested that, e.g. twists or stepwise bends the rectangular electrically insulated wire to be wound at the coil end and molds into a coil shape. Refer to e.g., JP-A-2012-228093 and JP-A-2009-112186. According to JP-A-2012-228093 and JP-A-2009-112186, the motor can be reduced in size by reducing the size of the coil end, i.e. the projecting portion of the rectangular electrically insulated wire.

Refer to e.g. JP-A-11-16428, JP-A-2011-142030, JP-A-2012-228093, and JP-A-2009-112186.

SUMMARY OF THE INVENTION

As shown in JP-A-2012-228093 and JP-A-2009-112186, however, when the rectangular electrically insulated wire is processed into the twisted or stepwise bent shape to reduce in size the coil and the motor, stress concentrates in the twisted or bent portion (particularly around vertices of the twisted or bent portion), and cracks are likely to form in the electrical insulating coating.

Accordingly, it is an object of the present invention to provide an electrically insulated wire, in which no crack is likely to form in an electrical insulating coating, even when twisted, for example. It is another object of the present invention to provide a production method for the electrically insulated wire.

According to an embodiment of the invention, an electrically insulated wire comprises:

a rectangular conductor having a substantially rectangular cross section with corners shaped in a circular arc; and an electrical insulating coating formed by heating an electrical insulating varnish applied to coat an outer periphery of the rectangular conductor, the electrical insulating coating including a thickest portion and a thinnest portion in a peripheral direction thereof, wherein the rectangular conductor has, in cross sectional shape, a curvature radius of the corners of 0.6 mm or less and a ratio $L_2/L_1$ of 2.0 or less where $L_1$ is a length of a short side in a width direction and $L_2$ is a length of a long side in a longitudinal direction, wherein the electrical insulating coating has a ratio $d_1/d_2$ of 1.3 or less where $d_1$ is a coating thickness of the thickest portion and $d_2$ is a coating thickness of the thinnest portion in the peripheral direction of the electrical insulating coating.

In the embodiment, the following modifications and changes may be made.

(i) The electrical insulating varnish has a varnish viscosity at 30 degrees Celsius of not less than 5 Pa·s and not more than 20 Pa·s.

(ii) The electrical insulating varnish includes one or more resins selected from the group comprising polyamide imide, polyimide and polyesterimide.

Points of the Invention

The present invention allows for providing the electrically insulated wire in which no crack is likely to form in the electrical insulating coating, even when twisted, for example.

BRIEF DESCRIPTION OF THE DRAWINGS

The preferred embodiments according to the invention will be explained below referring to the drawings, wherein:

FIG. 1 is a cross sectional view showing an electrically insulated wire in one embodiment of the present invention.

DETAILED DESCRIPTION OF THE PREFERRED EMBODIMENTS

To achieve the above object, the inventors have examined a factor of cracks forming when coiling, for example, twisting an electrically insulated wire. As a result, conventionally, it has been confirmed that cracks form in an electrical insulating coating, when the degree of baking in a peripheral direction thereof is non-uniform and makes properties such as mechanical strength, etc. non-uniform.

When the electrical insulating coating is formed, an electrical insulating varnish is applied at a uniform coating thickness so that the coating thickness of the electrical insulating coating is uniform in the peripheral direction, and the electrical insulating varnish is baked to form the electrical insulating coating. In practical baking, however, the electrical insulating varnish with a non-uniform coating thickness (coating thickness variations) in the peripheral direction is baked because the applied electrical insulating varnish flows due to surface tension before hardening and has a non-uniform coating thickness. Specifically, at corners of the rectangular conductor, the electrical insulating varnish flows out due to surface tension and the coating thickness is therefore thin, whereas at even surfaces between the corners, the electrical insulating varnish having flowed out at the corners flows in and the coating thickness is therefore thick. This results in variations in coating thickness: a thickest portion (thickest coating portion) and a thinnest portion (thinnest coating portion) in the peripheral direction of the electrical insulating varnish. When the electrical insulating varnish with variations in coating thickness is baked in this way, the electrical insulating coating with non-uniform coating thickness in the peripheral direction results. Because the different coating thickness portions of this electrical insulating coating are different in the degree of baking, the degree of baking in the peripheral direction of the electrical insulating coating is non-uniform. Particularly, the thickest portion, i.e. the thickest coating thickness portion, and the thinnest portion, i.e. the thinnest coating thickness portion of the electrical insulating coating are greatly different in the degree of baking. The great difference in the degree of baking of the electrical insulating coating makes properties (e.g., mechanical strength, etc.) of the electrical insulating coating non-uniform in the peripheral direction thereof. As a result, in the electrical insulating coating having non-uniform coating thickness, local stress concentration and cracking result from coiling such as twisting.

The present invention is made based on the foregoing findings.

One Embodiment of the Present Invention

Below are described an electrically insulated wire and a production method therefor in one embodiment of the present invention, in conjunction with FIG. 1. FIG. 1 is a cross sectional view showing the electrically insulated wire in one embodiment of the present invention.

(1) Electrically Insulated Wire

The electrically insulated wire 1 in one embodiment of the present invention comprises a rectangular conductor 10 having a substantially rectangular cross section with corners R shaped in a circular arc, and an electrical insulating coating 11 formed by heating an electrical insulating varnish applied to coat an outer periphery of the rectangular conductor 10. The electrical insulating coating 11 includes a thickest portion 11a and a thinnest portion 11b in the peripheral direction thereof. The rectangular conductor 10 has, in cross sectional shape, a curvature radius of the corners R of 0.6 mm or less and a ratio $L_2/L_1$ of 2.0 or less where $L_1$ is a length of a short side in a width direction and $L_2$ is a length of a long side in a longitudinal direction. The electrical insulating coating 11 has a ratio $d_1/d_2$ of 1.3 or less where $d_1$ is a coating thickness of the thickest portion 11a and $d_2$ is a coating thickness of the thinnest portion 11b in the peripheral direction of the electrical insulating coating 11. That is, the difference between the coating thickness $d_1$ of the thickest portion 11a and the coating thickness $d_2$ of the thinnest portion 11b is reduced so that the electrical insulating coating 11 is heated uniformly in the peripheral direction thereof. This results in the degree of baking in the peripheral direction of the electrical insulating coating 11 being substantially uniform, therefore allowing the properties (e.g., mechanical strength, etc.) of the electrical insulating coating 11 to be substantially uniform in the peripheral direction thereof. As a result, no crack is likely to form in the electrical insulating coating 11, even if stress resulting from coiling such as twisting concentrates locally around the vertices of twisted portion.

The rectangular conductor 10 has the substantially rectangular cross section with its corners R shaped in a circular arc. The rectangular conductor 10 has the four corners R and even surfaces F located between the corners R. The corners R are shaped into a circular arc, and their curvature radius is 0.6 mm or less. If the curvature radius is greater than 0.6 mm, it is difficult to sufficiently reduce the electrical insulating varnish flow resulting from surface tension when the electrical insulating varnish is applied to the outer periphery of the rectangular conductor 10.

Also, the rectangular conductor 10 has, in cross sectional shape, the short side $L_1$ in the width direction and the long side $L_2$ in the longitudinal direction, and the long side $L_2$ to short side $L_1$ ratio $L_2/L_1$ is 2.0 or less. If this ratio is greater than 2.0, it is difficult to sufficiently reduce the electrical insulating varnish flow resulting from surface tension when the electrical insulating varnish is applied to the outer periphery of the rectangular conductor 10. Note that the size of the short side $L_1$ and the long side $L_2$ is not particularly limited, but an optimal numerical value therefor is appropriately selected according to application, and, for example, the short side $L_1$ may be not less than 1.5 mm and not more than 3.5 mm, and the long side $L_2$ may he not less than 3.0 mm and not more than 4.0 mm.

The rectangular conductor 10 is not particularly limited, but uses e.g. a copper or copper alloy wire made of a low oxygen copper or oxygen free copper, another metal wire such as aluminum, silver, nickel or the like. Also, the rectangular conductor 10 may be plated with nickel or the like around its surface.

The electrical insulating coating 11 is formed by heating the electrical insulating varnish applied to coat the outer periphery of the rectangular conductor 10 and includes the thickest portion 11a and the thinnest portion 11b in the peripheral direction thereof. As mentioned above, the electrical insulating varnish applied around the outer periphery of the rectangular conductor 10 flows due to surface tension before hardening, in such a manner that at the corners R, the electrical insulating varnish flows out due to surface tension and its coating thickness is therefore relatively thin. Also, at the even surfaces F, the electrical insulating varnish having flowed out at the corners R flows in and its coating thickness is therefore relatively thick. As a result, the electrical insulating coating 11 is formed with the thickest portion 11a (coating thickness $d_1$) at the even surfaces F, and the thinnest portion 11b (coating thickness $d_2$) at the corners R.

In the present embodiment, however, when the electrical insulating varnish having predetermined viscosity is applied, the electrical insulating varnish flow resulting from surface tension is reduced by the use of the rectangular conductor 10 having the predetermined cross sectional shape. This allows the electrical insulating varnish in the thickest portion 11a to have such a coating thickness as to be heated uniformly together with the electrical insulating varnish in the thinnest portion 11b. That is, in the electrical insulating coating 11 formed by heating, the thickest portion 11a has the coating thickness $d_1$ so as to be heated uniformly together with the thinnest portion 11b having the predetermined coating thickness $d_2$.

The thickest portion 11a has the coating thickness $d_1$ so as to be heated uniformly together with the thinnest portion 11b having the predetermined coating thickness $d_2$. The coating thickness $d_1$ to be heated uniformly is determined from a relationship with the coating thickness $d_2$. That is, the coating thickness $d_1$ of the thickest portion 11a and the coating thickness $d_2$ of the thinnest portion 11b satisfy such a relationship that the ratio $d_1/d_2$ is 1.3 or less. This allows the reduction of the coating thickness variations in the peripheral direction of the electrical insulating coating 11.

In this embodiment, the coating thickness variations of the electrical insulating coating 11 are reduced, thereby allowing the reduction of the excessive decrease of the coating thickness $d_2$ of the thinnest portion 11b. This eliminates the need to increase the average coating thickness of the electrical insulating coating 11 in view of the decrease of the coating thickness $d_2$ of the thinnest portion 11b. That is, the average coating thickness of the electrical insulating coating 11 can be thinned.

For the constituent electrical insulating varnish of the electrical insulating coating 11, its viscosity is not particularly limited. If the varnish viscosity is too low, the electrical insulating varnish is likely to flow. Conversely, if the varnish viscosity is too high, the coatability of the electrical insulating varnish is likely to lower. Therefore, the varnish viscosity is preferably not less than 5 Pa·s and not more than 20 Pa·s at 30 degrees Celsius. The use of the electrical insulating varnish having such a varnish viscosity easily makes uniform the coating thickness of the electrical insulating varnish and the degree of baking in the peripheral direction of the electrical insulating coating 11.

The resin included in the electrical insulating varnish may be altered appropriately according to properties required for the electrically insulated wire 1. From the point of view of enhancement in electrical insulating properties and mechanical properties of the electrically insulated wire 1, it is preferred that the electrical insulating varnish includes one or more resins selected from the group comprising polyamide imide, polyimide and polyesterimide.

Note that, although in the present embodiment it has been described that as shown in FIG. 1, the thickest portion 11a of the electrical insulating coating 11 is located at the even surfaces F of the rectangular conductor 10, while the thinnest portion 11b of the electrical insulating coating 11 is located at the corners R of the rectangular conductor 10, the present invention is not limited to this case. The thinnest portion 11b generally tends to be located at the corners R, but is also considered to be located at regions other than the corners R, depending on a manner of the electrical insulating varnish flow. In any case, the present invention reduces the electrical insulating varnish flow, and therefore the coating thickness variations in the peripheral direction of the electrical insulating coating 11.

Also, an adhesion imparting electrical insulating coating to enhance adhesion, or a flexibility imparting electrical insulating coating to enhance flexibility may be interposed between the rectangular conductor 10 and the electrical insulating coating 11. Also, a lubrication imparting electrical insulating coating to enhance lubrication, or an abrasion resistance imparting electrical insulating coating may be may be provided around the electrical insulating coating 11. These adhesion, flexibility, lubrication, and abrasion resistance imparting electrical insulating coatings may be formed by electrical insulating varnish applying and baking.

Also, in FIG. 1, the electrical insulating coating 11 has the single layer structure, but may have a multi-layer structure. That is, the multi-layer structure may be formed by providing, between the rectangular conductor 10 and the electrical insulating coating 11, an organic electrical insulating coating made of polyimide, polyamide imide, polyesterimide, class H polyester or the like.

(2) Production Method for the Electrically Insulated Wire

First, there is prepared the rectangular conductor 10 having a substantially rectangular cross section with its corners R shaped into a circular arc. At this point, there is prepared the rectangular conductor 10 having, in cross sectional shape, a curvature radius of the corners R of 0.6 mm or less and a ratio $L_2/L_1$ of 2.0 or less where $L_1$ is a length of a short side in a width direction and $L_2$ is a length of a long side in a longitudinal direction.

Subsequently an electrical insulating varnish having a predetermined varnish viscosity (e.g., a viscosity at 30 degrees Celsius of not less than 5 Pa·s and not more than 20 Pa·s) is applied around the outer periphery of the rectangular conductor 10 at a predetermined coating thickness (e.g., 4 μm). In this case, the electrical insulating varnish is likely to flow at the corners R of the rectangular conductor 10 due to greater surface tension acting thereon than at the even surfaces F of the rectangular conductor 10. In the present embodiment, however, the electrical insulating varnish outflow at the corners R and inflow at the even surfaces F can be reduced by the use of the rectangular conductor 10 having the predetermined cross sectional shape. In other words, the electrical insulating varnish is applied with its coating thickness being uniform.

At this point, the applied electrical insulating varnish has a predetermined coating thickness (coating thickness $d_1$) at the even surfaces F of the rectangular conductor 10, and a predetermined coating thickness (coating thickness $d_2$) at the corners R of the rectangular conductor 10. In this embodiment, the coating thickness variations are reduced, thereby allowing the uniform heating and baking of the electrical insulating varnish on the even surfaces F and the corners R. That is, in the peripheral direction of the resulting electrical insulating coating 11, the variations in the degree of baking can be reduced.

Subsequently the electrical insulating varnish applied around the rectangular conductor 10 is baked, resulting in an electrical insulating coating having a predetermined thickness of, for example 4 μm. The resulting electrical insulating coating has reduced coating thickness variations in its peripheral direction.

Subsequently the above mentioned electrical insulating varnish applying and baking is repeated a predetermined number of times, resulting in a stack of 4 μm thick electrical insulating coatings, for example, 40 μm thick electrical insulating coating 11. This results in the electrically insulated wire 1 in the present embodiment.

EXAMPLES

Next, examples of the present invention are described.

In these examples, electrically insulated wires were produced by forming electrical insulating coatings from electrical insulating varnishes having different viscosities at 30 degrees Celsius. Then the respective coating thicknesses in the peripheral direction of the electrical insulating coatings of the resulting electrically insulated wires were measured and their respective uniformities were evaluated.

Using rectangular dies, the electrical insulating varnishes having predetermined viscosities were applied and baked around the outer periphery of rectangular conductors having predetermined dimensions and predetermined curvature radii, resulting in the electrical insulating coatings. Then the above mentioned electrical insulating varnish applying and baking was repeated a plurality of times, resulting in electrically insulated wires with electrical insulating coatings having predetermined coating thicknesses.

Examples 1 to 3 and Comparative examples 1 and 2 used the rectangular conductors having predetermined dimensions and predetermined curvature radii, as shown in Table 1 below. Also, example 1-3 and Comparative examples 1 and 2 used the electrical insulating varnishes having different viscosities at 30 degrees Celsius, and the varnish viscosity thereof was 10 Pa·s in Example 1, 5 Pa·s in Example 2, 20 Pa·s in Example 3, 3 Pa·s in Comparative example 1, and 30 Pa·s in Comparative example 2. Also, the average coating thickness of the electrical insulating coatings was 40 μm in Examples 1 to 3, and 20 μm in Comparative examples 1 and 2.

Examples 1 to 3 used the electrical insulating varnishes having the viscosities at 30 degrees Celsius of not less than 5 Pa—s and not more than 20 Pa—s. As shown in Table 1, it was confirmed that Examples 1 to 3 were able to reduce coating thickness variations in the peripheral direction of their respective electrical insulating coatings as small as the maximum coating thickness $d_1$ to minimum coating thickness $d_2$ ratios ($d_1/d_2$) of 1.3 or less. Also, it was confirmed that Examples 1 and 3 were able to reduce coating thickness variations in the peripheral direction of their respective electrical insulating coatings even when the curvature radii of the rectangular conductors were reduced. That is, the electrically insulated wires in Examples 1 to 3 were reduced in coating thickness variations, thereby allowing enhancement in coil space factor.

On the other hand, it was confirmed that Comparative example 1 was not able to sufficiently reduce the electrical insulating varnish flow resulting from surface tension due to the viscosity of the electrical insulating varnish being too low, and was therefore non-uniform in coating thickness in the peripheral direction of the resulting electrical insulating coating. Also, it was confirmed that Comparative example 2 caused conductor elongation due to the viscosity of the electrical insulating varnish being too high. The conductor elongation occurred when the electrical insulating varnish coated rectangular conductor was inserted in the coating die, and its coating thickness was adjusted. When the electrical insulating varnish viscosity was too high, the rectangular conductor was difficult to insert, and was stretched and elongated. Due to the occurrence of the conductor elongation, the rectangular conductor varied in cross sectional area before and after electrical insulating varnish application. It was confirmed that Comparative example 2 was greater than 1% in the change ratio of the cross sectional area ($D_2$) of the rectangular conductor after the electrical insulating varnish application to the cross sectional area ($D_1$) of the rectangular conductor before the electrical insulating varnish application. Therefore, in Comparative example 2, no coating thickness in the peripheral direction of the electrical insulating coating was measured. It should be noted that Examples 1 to 3 and Comparative example 1 were smaller than 1% in the change ratio of the cross sectional areas before and after the electrical insulating varnish application, and it was therefore confirmed that no conductor elongation occurred in Examples 1 to 3 and Comparative example 1.

TABLE 1

| | | | Example 1 | Example 2 | Example 3 | Comparative example 1 | Comparative example 2 |
|---|---|---|---|---|---|---|---|
| Insulated wire | Rectangular conductor | Short side length $L_1$ [mm] | 1.5 | 3.5 | 2.0 | 2.0 | 2.0 |
| | | Long side length $L_2$ [mm] | 3.0 | 4.0 | 3.0 | 3.0 | 3.0 |
| | | Short to long side ratio ($L_2/L_1$) | 2.0 | 1.1 | 1.5 | 1.5 | 1.5 |
| | | Corner curvature radius [mm] | 0.3 | 0.6 | 0.3 | 0.3 | 0.3 |
| | Insulating coating | Average coating thickness [μm] | 40 | 40 | 40 | 20 | 20 |
| | | Thickest portion d1 to thinnest portion d2 coating thickness ratio (d1/d2) | 1.2 | 1.3 | 1.3 | 1.6 | — |
| | Insulating varnish viscosity [Pa · s] at 30° C. | | 10 | 5 | 20 | 3 | 30 |

For the electrical insulating coatings of the resulting electrically insulated wires, the respective cross sections of the electrically insulated wires as shown in FIG. 1 were observed with an optical microscope, and the respective coating thicknesses in the peripheral direction of the electrical insulating coatings were measured, and the maximum coating thickness $d_1$ to minimum coating thickness $d_2$ ratios ($d_1/d_2$) were computed. Then, based on the ratios, the respective uniformities of the coating thicknesses in the peripheral direction of the electrical insulating coatings were evaluated. Evaluated results were shown in Table 1.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An electrically insulated wire, comprising:
a rectangular conductor having a substantially rectangular cross section with corners shaped in a circular arc; and
an electrical insulating coating formed by heating an electrical insulating varnish applied to coat an outer periphery of the rectangular conductor, the electrical insulating coating including a thickest portion and a thinnest portion in a peripheral direction thereof,
wherein the rectangular conductor has, in cross sectional shape, a curvature radius of the corners of 0.6 mm or less and a ratio $L_2/L_1$ of $1.5 \leq L_2/L_1 \leq 2.0$, where $L_1$ is a length of a short side in a width direction and $L_2$ is a length of a long side in a longitudinal direction,
wherein the electrical insulating coating has a ratio $d_1/d_2$ of $1.2 \leq d_1/d_2 \leq 1.3$, where $d_1$ is a coating thickness of the thickest portion of the electrical insulation coating at even surfaces F, and $d_2$ is a coating thickness of the thinnest portion of the electrical insulation coating at corners R in the peripheral direction of the electrical insulating coating.

2. The electrically insulated wire according to claim 1, wherein the electrical insulating varnish has a varnish viscosity at 30 degrees Celsius of not less than 5 Pa·s and not more than 20 Pa·s.

3. The electrically insulated wire according to claim 1, wherein the electrical insulating varnish includes one or more resins selected from the group comprising polyamide imide, polyimide and polyesterimide.

* * * * *